Figure 1:
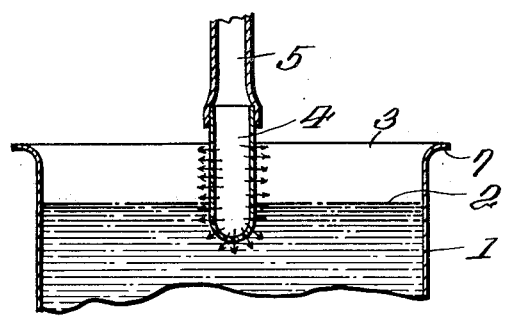

Nov. 9, 1943.    A. E. STEVENSON ET AL    2,333,898
METHOD OF PACKAGING FRUIT AND VEGETABLE JUICES
Filed Oct. 7, 1941

INVENTORS
A. E. Stevenson
J. M. Boyd
By Mason & Porter
ATTORNEYS

Patented Nov. 9, 1943

2,333,898

UNITED STATES PATENT OFFICE 2,333,898

METHOD OF PACKAGING FRUIT AND VEGETABLE JUICES

Arthur E. Stevenson and John M. Boyd, Chicago, Ill., assignors to Continental Can Company, Inc., New York, N. Y., a corporation of New York Application October 7, 1941, Serial No. 413,984

1 Claim. (Cl. 99—155)

It has been found desirable in the packaging of fruit juices to remove air from the headspace of the containers and substitute therefor a gas that will not react with the contents of the container or with the container itself. Such gases will be referred to hereinafter as inert gases, examples of which are nitrogen and carbon dioxide gas. The presence of the oxygen air in the headspace of containers often deleteriously affects the flavor of the juice during sterilization or storage. It also oxidizes the vitamins of the juice, thus decreasing the vitamin content. Further, oxygen in the headspace of a container has a deleterious effect on some enamels where the containers are lined with enamel to prevent the juice from contacting with the metal of the container. Also when plain or unenameled containers are used, the oxygen in the headspace often increases the solution of metal from the container, thus increasing corrosion and pin-holing with resulting leaks.

Attempts have been made to remove the air from the headspace of filled containers by directing a jet of inert gas into the headspace. This method is not only inefficient as to the removal of the air, but it is wasteful of the inert gas. It has also been a common expedient in the packaging of carbonated beverages, such as beer and ale, to agitate the contents so as to release the carbon dioxide from the beverage and cause foaming which will crowd the air out of the headspace. This method, of course, cannot be applied to fruit juices and vegetable juices which are not carbonated.

An object of the present invention is to provide a method whereby an inert gas may be used to create bubbles in a non-carbonated juice and thereby produce a foam which will crowd the air from the headspace of the container immediately prior to the covering and sealing of the container.

We have discovered that citrous juices, tomato juice and some other fruit and vegetable juices contain substances which decrease the surface tension of the liquid and if an inert gas from minute orifices is passed into them, just beneath the surface thereof, a foam will form on the surface consisting of very small bubbles holding the inert gas which has been passed into the juice. Applicant has also found that if the supply of inert gas is continued, the entire headspace will be filled with foam consisting of these very small bubbles filled with inert gas and the foam will be sustained for a period of time sufficient to permit the closing and sealing of the container.

We have applied the above principles to the packaging of juices such as citrous juices, tomato juice and the like. The essential steps in the carrying out of applicant's improved method of packaging juices in sealed containers are as follows:

The container in which the juice is to be marketed is filled with a quantity of juice sufficient to leave a predetermined headspace. Immediately prior to the passing of the filled container into a closing machine where cover is applied and seamed thereto for sealing the container, a multitude of jets of inert gas are directed into the juice, preferably centrally of the headspace and immediately below the surface of the juice. This may be accomplished by a metal tube closed at the lower end and perforated with minute orifices. The tube is connected with a supply of inert gas, preferably under relatively low pressure. The gas passing from these minute orifices will form in the juice very small bubbles which will rise to the surface and produce a foam. The surface tension of the juice is sufficiently low so that the foam will persist and be maintained for a short period of time sufficient to permit the closing of the container. The jets of gas issuing from the orifices in the tube end are continued until the entire headspace is filled with the foam which, adhering to the walls of the container will extend above the container flange. The tube is then withdrawn and the foam will still fill the entire headspace. Immediately a cover is applied and seamed to the container. The lower end of the tube containing the orifices is preferably rounded so as to facilitate the distribution of the bubbles that come to the surface and form the foam, so that the foam will fill the entire headspace. In small containers, a single tube with a multitude of orifices is sufficient; in larger containers more than one tube may be used if found necessary in order to bring about a very quick and efficient formation of the foam filled with the inert gas to such an extent that the air in the headspace is excluded therefrom. When the container is closed, the headspace is still filled with foam containing the inert gas used to replace the air in the headspace.

The time period of flow of gas necessary to produce a foam will vary with the juice in question, the size of the bubbles produced, the size of the container, the headspace of the container and the pressure in the gas reservoir supplying the inert gas.

Figure 2:
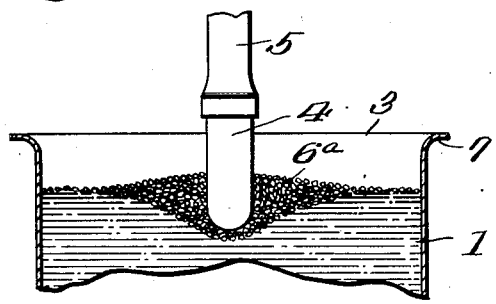
Figure 3:
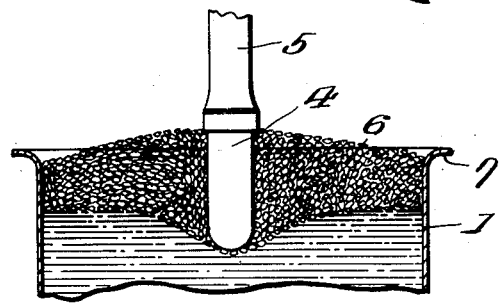
Figure 4:
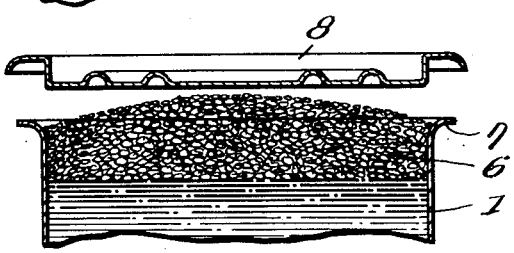
Figure 5:
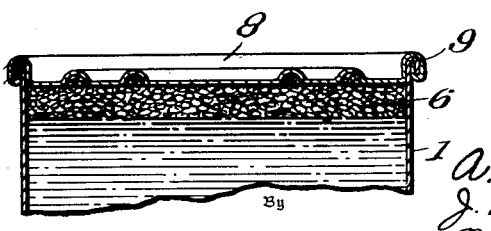

Instead of a tube having a multitude of small orifices, it has been found that a porous ceramic tube and a porous metal tube having a closed end provides an excellent medium for injecting the minute streams of gas into the juice. In Figure 1 of the drawing, such a means is shown for creating a foam in the juice. The container is of the usual type and is indicated at 1. The level of the juice is indicated at 2, thus providing a headspace 3. After the can has been filled to the extent shown in Figure 1, which is indicated to be of a desired, pre-determined headspace, the ceramic tube 4, which is carried by a supply pipe 5, is inserted in the container and into the juice a very short distance beneath the surface thereof. The inert gas under low pressure is caused to issue through the pores of the ceramic tube and this forms very small bubbles charged with the inert gas which rise to the surface and produce a foam which will completely fill the headspace of the container. In Figure 2, the initial foaming of the liquid by the introducing of the inert gas is indicated at 6a. In Figure 3 the supply of the gas is continued until the entire headspace is filled with foam as indicated at 6. In Figure 4 the tube supplying the gas has been removed, leaving the container filled with foam indicated at 6, which foam extends above the plane of the flange 7 of the container 1. Immediately a cover 8 is applied, which cover contacts with the foam leaving the headspace completely filled with the foam charged with the inert gas. The cover, as soon as applied, is seamed to the container by the usual double seam 9 as shown in Fig. 5. This leaves the container headspace filled with the inert gas.

In actual experience in the packaging of orange juice in small cans with a normal headspace, it has been found that when using a porous ceramic tube and low pressure of gas, a foam sufficient to fill the headspace of the container can be produced in .02 minute and that by this means the air in the headspace of the container is reduced to 5% of that which is present in the headspace before the treatment is applied.

Some juices foam considerably when being filled into the container. The bubbles in this foam contain air. Under such conditions it may be necessary to allow the flow of inert gas to continue for a longer time to remove the air-contained foam already produced.

It is understood that the efficiency of the method described above may depend to some extent on the diameter of the tube used and the shape of the tube and particularly the dip end of the tube. It is not intended to limit this invention to any particular design of apparatus. It is essential, however, that in case of a metal tube minute perforations should extend over the entire area which is to be dipped below the surface of the juice in the container, and in the case of the gas-porous ceramic tubes the portion of the tube introduced below the liquid level should consist of this material.

Where the surface tension of the liquid to be packaged is not naturally sufficiently low to produce the desired foam, substances decreasing the surface tension might be added to the liquid. This, however, is not necessary in connection with citrous juices, tomato juice and certain other fruit and vegetable juices.

It is obvious that there may be many changes in the apparatus used in carrying out the method and also in the details of the method steps without departing from the spirit of the invention as set forth in the appended claim.

We claim:

A method of packaging in sealed containers fruit and vegetable juices which have a surface tension low enough to provide a small bubble foam at the surface when an inert gas is finely dispersed therein, said method consisting in filling the container with a quantity of juice sufficient to leave a predetermined headspace and, immediately prior to covering and sealing the container, discharging a multitude of minute jets of inert gas into the juice in the open container only at points close beneath the surface thereof and at low pressure, in order to cause small bubbles to form closely adjacent the top surface and produce a surface foam layer containing the inert gas and continuing the supply of the inert gas until the entire headspace is filled with the inert gas-charged small bubble foam and substantially all the air initially in the headspace is crowded out therefrom by said foam, placing the cover on the container while the foam essentially fills the headspace and seaming the cover to the container for sealing the same.

ARTHUR E. STEVENSON.
JOHN M. BOYD.